May 22, 1962

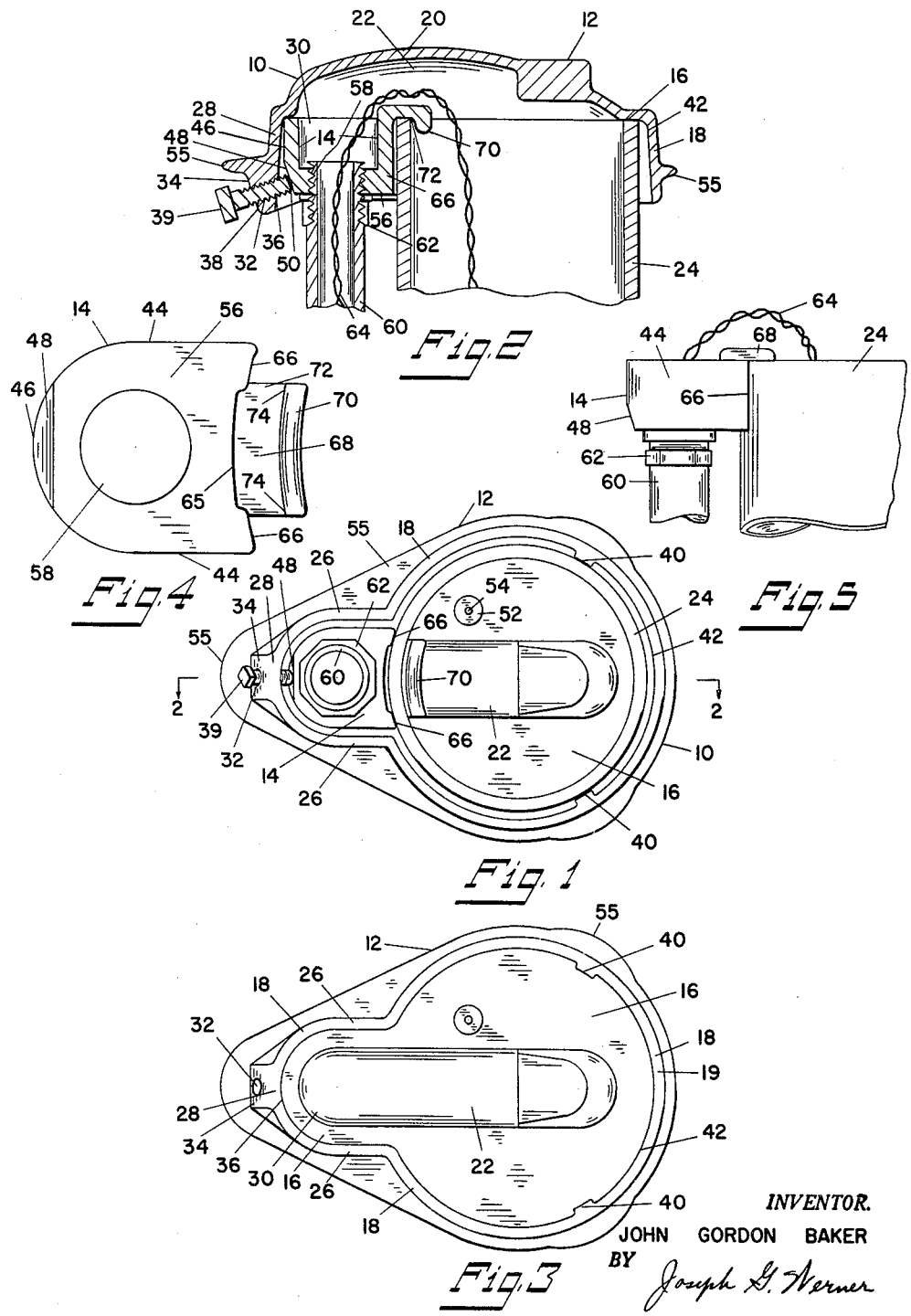

J. G. BAKER 3,035,732

CASING CAPS

Filed July 19, 1960

INVENTOR.
JOHN GORDON BAKER
BY Joseph G. Werner
ATTORNEY

3,035,732
CASING CAPS

John Gordon Baker, Evansville, Wis., assignor to Baker Manufacturing Company, Evansville, Wis., a corporation of Wisconsin
Filed July 19, 1960, Ser. No. 43,808
7 Claims. (Cl. 220—3.8)

This invention relates to casing caps, particularly to caps providing an entry for electrical cable, and especially casing caps for wells where electrical cable extends from a power source to an electric pump within the casing.

It is an object of this invention to provide a casing cap having a cable entry which permits removal of the top cap portion for access to the interior of the casing without detachment or change of position of the cable.

Another object of the invention is to provide a casing cap which may be simply secured to the casing by a single set screw.

A further object of the invention is to provide a casing cap which, when in secured position, is retained in close position with the casing by exerted pressure of one or more set screws.

An additional object of the invention is to provide a casing cap which is fitted in such close proximity to the end of the casing as substantially to prevent entry of foreign matter into the interior of the casing.

Other objects and advantages of the invention will be obvious from the following detailed description of an embodiment thereof, and the accompanying drawings.

FIG. 1 is a bottom plan view of my casing cap as secured to a casing with an electrical conduit attached.

FIG. 2 is a cross-sectional view of my casing cap as secured to a casing, with electrical conduit attached, along the line 2—2 of FIG. 1.

FIG. 3 is a bottom plan view of the top cap portion of my casing cap.

FIG. 4 is a bottom view of the adapter for my casing cap.

FIG. 5 is a side view of the adapter with attached electrical conduit, seated on the end of the casing.

Figure 6:
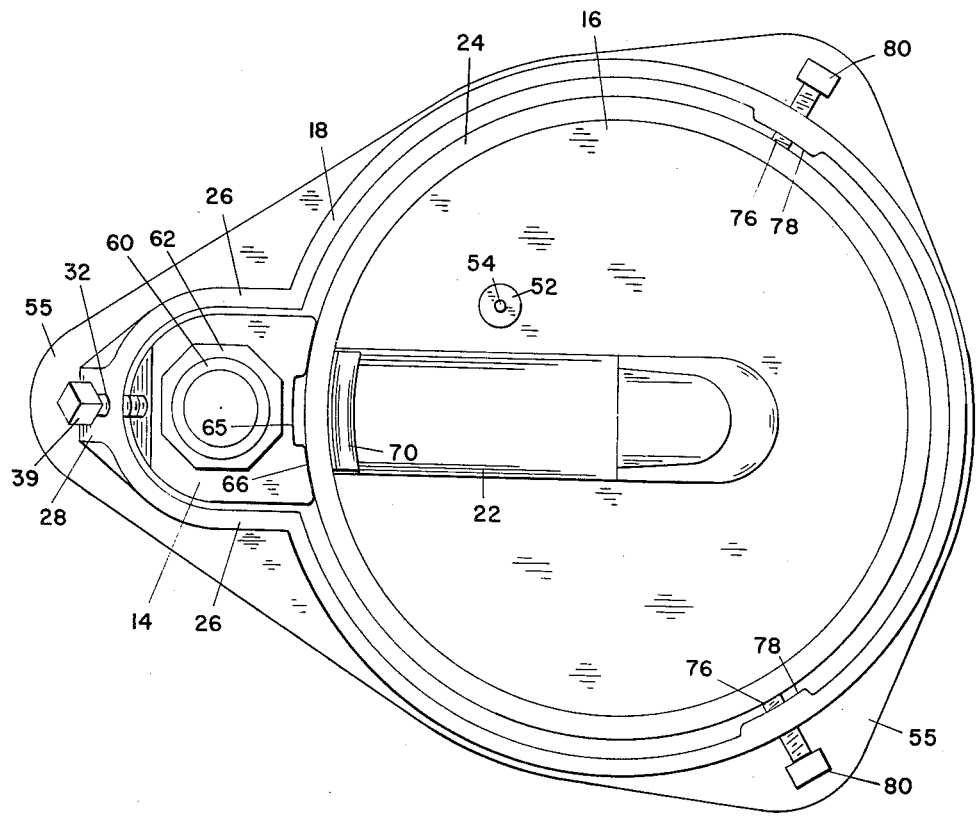
FIG. 6 is a bottom view of a modified form of my casing cap as secured to a casing, with electrical conduit attached.

My casing cap 10 consists of a top cap portion 12 and an adapter 14. In the embodiment illustrated in the drawings, top cap portion 12 has an inner surface or ceiling 16 and downwardly extending continuous sidewall 18. The ceiling has an elongated raised area 20, creating an elongated recess or vaulted section 22 within the body of the top cap portion 12. The enlarged portion 19 of the wall 18 of the top cap portion has the same general line of curvature as the casing 24, with the forwardly or outwardly extending sides 26 and the front or outer side 28 of wall 18 forming adapter pocket 30. Threaded aperture 32 extends at a slight slant upwardly as it extends from the outer side 34 to the inner side 36 of the lower portion 38 of the front or outer side 28. The degree of the slant of aperture 32 may vary somewhat though I have found a slant of about 17° from horizontal to be satisfactory. Set screw 39 extends through aperture 32.

Projections 40, preferably flattened extend outwardly from the inner side 42 of wall 18. Such projections 40 are preferably situated in the rearward portion of said wall 18 and respectively spaced on each side of elongated recess 22. Outwardly extending rim 55 may be included in the casting of the seal cap 10 to provide strength and a means for grasping the cap, particularly for removal of the cap from the casing. It also acts as a guard for the set-screw 39.

The adapter 14 has sides 44 with a forward end 46 preferably shaped to fit within front or outer side 28 and forward or outwardly extending sides 26 of wall 18. Adapter 14 has bevelled surface 48 at its lower front or outer end, with which the end 50 of set-screw is in contact when the seal cap is in assembled position. Plug 52 with threaded aperture 54 may be provided for attachment of a chain and tag with pump informational data thereon.

Adapter 14 has a floor 56 through which threaded aperture 58 extends for connection of conduit 60 by lock nut 62. Conduit 60 carries electric cable 64 from the electric power source to the pump within the casing.

The projections 66 of the rearward or inner side 65 of adapter 14 substantially fit the outer wall of the casing 24. Flange 68 extends rearwardly or inwardly from the top of rearward or inner side 65 of the adapter 14. The flange 68 carries downward extending lip 70, the inner side 74 of which has the same general curvature as the inner wall of the casing 24. The groove 72 between the inner side 74 of lip 70 and the face of projections 66 is slightly greater than the thickness of the wall of the casing 24.

A modified form of my invention is shown in FIG. 6. The construction is generally similar to that described above, except that threaded apertures 76 extend through flattened projections 78, and set-screws 80 extend through such apertures. Apertures 76 are slanted in a manner similar to apertures 32 described above.

In operation, the adapter 14, either before or after being connected to conduit 60, is placed with projections 66 against the outer surface of casing 24 and flange 68 over the upper edge of casing 24 as shown in FIGS. 1, 2, and 5. The adapter 14 is retained in position on the casing edge by lip 70. The electric cable extending from the power source to the electric pump (not shown) in the well, extends through the conduit 60 and down inside casing 24.

The top cap portion 12 of the casing cap is then placed over the top of the casing 24 and the adapter 14, as shown, when set screw 39 is in loosened position. Flange 68 is seated within the vaulted section 22, while the sides 44 and end 46 of the adapter are seated under the ceiling 16. Thus the surface of the ceiling of the top cap portion and the groove 72 of the adapter are substantially flush as they rest upon the top of casing 24. Set screw 39 is then tightened against bevelled surface 48 of adapter 14. The tightening of the set screw 39 draws the projections 66 against the surface of the casing 24, and, in turn, the projections 40 on the top cap portion 12 are drawn against the surface of the casing so that the seal cap 10 is securely held over the top of the casing. The upward slant of the set screw 39 and bevelled surface 48 forces the adapter against the top surface 16 of top cap portion 12, so that the ceiling surface of said top cap portion and flange 68 rest evenly upon the top of the casing 24, to minimize the likelihood of foreign matter from entering the casing. The casing cap is thus retained securely on the casing by the pressure of projections 40 and 66 against the outside wall of the casing.

When removal of the cap is desired, it is necessary only to loosen set screw 39 so that the top cap portion 12 may be lifted off without disturbing adapter 14 and the attached electrical cable, as shown in FIG. 5.

The modification shown in FIG. 6 operates similarly to the casing cap described above, except that in order to obtain a tighter fit for shipping purposes, set screws 80 may be tightened directly against the casing. In other respects, set screw 39 is turned against adapter 14, as previously described. Also, to remove the top cap from the casing, set screw 39 is loosened as well as one or more of set screws 80, if necessary.

It is to be understood that the present invention is not confined to the particular construction or arrangement of parts or methods herein illustrated, but embraces all such modifications and alterations thereof, as may come within the scope of the following claims.

I claim:

1. A cap for a casing providing an electrical cable passage comprising, a top cap portion having a continuous sidewall and a ceiling extending from the periphery of said sidewall and including a vaulted section, said sidewall extending downwardly of said ceiling and defining an enlarged portion for the end of the casing and an outwardly extending portion forming an adapter pocket, a removable adapter receivable in said adapter pocket, means in the adapter pocket forming portion of the sidewall engageable with said adapter for effecting a clamping action between the adapter and sidewall and the casing, said adapter having a cable passage and said cable passges being in communication with said vaulted section of the ceiling when said adapter is in said adapter pocket.

2. The cap of claim 1 wherein a plurality of projections extend inwardly from the enlarged portion of the sidewall and from the adapter for engagement with the outer wall of the casing.

3. The cap of claim 1 wherein the adapter carries means engageable with the adjacent end portion of the casing for supporting the adapter upon the casing.

4. The cap of claim 3 wherein the adapter supporting means comprises a flange extending inwardly of the adapter across the adjacent end of the casing and a lip depending from said flange inside the casing.

5. The cap of claim 1 wherein the means in the adapter pocket forming portion of the sidewall for clamping the adapter and sidewall to the casing is a set screw means.

6. The cap of claim 5 wherein the set screw slants inwardly and upwardly of the sidewall.

7. The cap of claim 6 wherein the adapter is provided with a bevelled surface perpendicular to the axis of the set screw for contact with the set screw.

References Cited in the file of this patent

UNITED STATES PATENTS

| | | |
|---|---|---|
| 1,648,704 | Volk | Nov. 8, 1927 |
| 2,793,699 | Tubbs | May 28, 1957 |
| 2,865,981 | Budnick | Dec. 23, 1958 |